US012023910B2

(12) United States Patent
Hori

(10) Patent No.: US 12,023,910 B2
(45) Date of Patent: Jul. 2, 2024

(54) RECORDING SYSTEM, RECORDING APPARATUS AND RECORDING METHOD

(71) Applicant: SEIKO EPSON CORPORATION, Tokyo (JP)

(72) Inventor: Naoki Hori, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 197 days.

(21) Appl. No.: 17/807,882

(22) Filed: Jun. 21, 2022

(65) Prior Publication Data

US 2022/0410589 A1 Dec. 29, 2022

(30) Foreign Application Priority Data

Jun. 23, 2021 (JP) ................................ 2021-104023

(51) Int. Cl.
*B41J 11/00* (2006.01)
*B41J 29/393* (2006.01)

(52) U.S. Cl.
CPC .......... *B41J 11/007* (2013.01); *B41J 11/0095* (2013.01); *B41J 29/393* (2013.01)

(58) Field of Classification Search
CPC .. B41J 13/0009; B41J 11/007; B41J 11/0095; B41J 11/66; B41J 15/005; B41J 15/046; B41J 29/393
See application file for complete search history.

(56) References Cited

U.S. PATENT DOCUMENTS

| | | | |
|---|---|---|---|
| 8,915,567 B2 | 12/2014 | Tanjo et al. | |
| 10,173,442 B2 | 1/2019 | Shiiya et al. | |
| 2005/0095050 A1* | 5/2005 | Saito | B41J 19/202 400/611 |

FOREIGN PATENT DOCUMENTS

| | | |
|---|---|---|
| JP | 2013-116786 A | 6/2013 |
| JP | 2013-176912 A | 9/2013 |
| JP | 2018-154070 A | 10/2018 |

* cited by examiner

*Primary Examiner* — Jannelle M Lebron
(74) *Attorney, Agent, or Firm* — WORKMAN NYDEGGER

(57) ABSTRACT

A recording system that when formation of the image is restarted after a temporal stop of the formation of the image by temporarily stopping the conveyance of the recording target medium by the first conveyance unit and the discharging of the ink from the discharging part, a distance from a first position to a recording restart position is an integer multiple of image formation pitch, the first position being based on a position, at the time of the temporal stop, of the image that is formed on the recording target medium before the temporal stop, the recording restart position being a position where the ink is discharged at the time of the restart; and performing the post-processing on the recording target medium at the post-processing unit each time the recording target medium is conveyed, by the second conveyance unit, a distance corresponding to the image formation pitch.

9 Claims, 8 Drawing Sheets

RECORDING SYSTEM, RECORDING APPARATUS AND RECORDING METHOD

The present application is based on, and claims priority from JP Application Serial Number 2021-104023, filed Jun. 23, 2021, the disclosure of which is hereby incorporated by reference herein in its entirety.

BACKGROUND

1. Technical Field

The present disclosure relates to a recording system, a recording apparatus and a recording method.

2. Related Art

In the related art, various recording apparatuses that perform recording on a recording target medium are used. For example, JP-A-2018-154070 discloses a printing device that performs recording of an image on a recording target medium in a roll form. In addition, in the related art, post-processing apparatuses that perform post-processing on a recording target medium on which an image is formed are known. For example, JP-A-2013-176912 discloses a label processing apparatus that cuts out a label by performing post-processing on a recording target medium in a roll form on which a label is formed.

A recording system can be provided by coupling the post-processing apparatus that performs post-processing on a recording target medium on which an image is formed such as the apparatus disclosed in JP-A-2013-176912 at a succeeding stage of the recording apparatus that forms an image on a recording target medium such as the apparatus disclosed in JP-A-2018-154070. In such a recording system, it is necessary to adjust the position of the post-processing of the post-processing apparatus in accordance with the position of the image formed by the recording apparatus. In the related art, a position adjustment step, which is the adjustment of the post-processing position with respect to the image position, includes an operation that has to be manually performed by the user.

In general, at the position adjustment step, the post-processing timing is matched with the image formation timing of the recording apparatus. More specifically, the time required for image formation and the time required for the post-processing time are matched with each other. At this time, from the viewpoint of the ease of adjustment, the conveyance speed of the recording target medium corresponding to recording speed is performed at a low speed, and the time required for the post-processing time and the time required for the formation of the image at the low speed are matched with each other. Further, at the main production step for the image, the recording target medium is conveyed at a high speed for the purpose of increasing the production efficiency. For the post-processing timing at the main production step for the image, the control unit computes the desired post-processing timing in accordance with the conveyance speed of the recording target medium on the basis of the post-processing timing adjusted at the position adjustment step.

Known recording systems can automatically perform the interval adjustment of the post-processing timing with respect to the image formation timing at the main production step on the basis of the post-processing timing and the image formation timing at the position adjustment step. In known recording systems, however, the adjustment of the post-processing start timing with respect to the image formation start timing at the main production step cannot be automatically performed while the interval adjustment can be automatically performed. Even in the case where the interval adjustment is appropriately performed at the position adjustment step, if the image formation start timing is shifted with respect to the post-processing start timing at the main production step, the post-processing is continuously performed while keeping the state where the timing is shifted from the desired post-processing timing. That is, the post-processing is continuously performed at a position shifted from a desired position with respect to the image. In known recording systems, it is necessary for the user to manually perform the adjustment of the post-processing start timing with respect to the image formation start timing. In addition, the shift can occur not only between the position adjustment step and the main production step, but also at the restart of the image formation after the temporal stop of the image formation.

SUMMARY

A recording system according to the present disclosure for solving the above-mentioned problems includes a recording apparatus configured to form an image at a constant interval pitch on a recording target medium, a post-processing apparatus coupled to the recording apparatus and configured to perform post-processing on the recording target medium on which an image is formed by the recording apparatus, and a control unit configured to control the recording apparatus and the post-processing apparatus. The recording apparatus includes a first conveyance unit configured to convey the recording target medium, and a discharging part configured to discharge ink to the recording target medium conveyed by the first conveyance unit, the post-processing apparatus includes a second conveyance unit configured to convey the recording target medium, and a post-processing unit configured to perform post-processing on the recording target medium conveyed by the first conveyance unit, the control unit controls conveyance of the recording target medium by the first conveyance unit and discharging of the ink from the discharging part such that when formation of the image is restarted after a temporal stop of the formation of the image by temporarily stopping the conveyance of the recording target medium by the first conveyance unit and the discharging of the ink from the discharging part, a distance from a first position to a recording restart position is an integer multiple of the pitch, the first position being based on a position, at the time of the temporal stop, of the image that is formed on the recording target medium before the temporal stop, the recording restart position being a position where the ink is discharged at the time of the restart, and the control unit performs control such that the post-processing unit performs the post-processing on the recording target medium each time the recording target medium is conveyed, by the second conveyance unit, a distance corresponding to the pitch.

A recording apparatus according to the present disclosure for solving the above-mentioned problems includes a first conveyance unit configured to convey a recording target medium, a discharging part configured to discharge ink to the recording target medium conveyed by the first conveyance unit, and a control unit. The recording apparatus is configured to form an image at a constant interval pitch on the recording target medium, the recording apparatus is used with a post-processing apparatus including a second conveyance unit configured to convey the recording target medium and a post-processing unit configured to perform post-processing on the recording target medium conveyed by the first conveyance unit, the post-processing apparatus being coupled to the recording apparatus and configured to perform the post-processing on the recording target medium on which an image is formed by the recording apparatus, and the control unit controls conveyance of the recording target medium by the first conveyance unit and discharging of the ink from the discharging part such that when formation of the image is restarted after a temporal stop of the formation of the image by temporarily stopping the conveyance of the recording target medium by the first conveyance unit and the discharging of the ink from the discharging part, a distance from a first position to a recording restart position is an integer multiple of the pitch to allow for the post-processing on the recording target medium at the post-processing unit each time the recording target medium is conveyed, by the second conveyance unit, a distance corresponding to the pitch, the first position being based on a position, at the time of the temporal stop, of the image that is formed on the recording target medium before the temporal stop, the recording restart position being a position where the ink is discharged at the time of the restart.

A recording method according to the present disclosure for solving the above-mentioned problems includes is a method for a recording system, the recording system including a recording apparatus and a post-processing apparatus, the recording apparatus including a first conveyance unit configured to convey a recording target medium and a discharging part configured to discharge ink to the recording target medium conveyed by the first conveyance unit, the recording apparatus being configured to form an image at a constant interval pitch on the recording target medium, the post-processing apparatus including a second conveyance unit configured to convey the recording target medium and a post-processing unit configured to perform post-processing on the recording target medium conveyed by the first conveyance unit, the post-processing apparatus being coupled to the recording apparatus and configured to perform the post-processing on the recording target medium on which an image is formed by the recording apparatus, the method comprising executing conveyance of the recording target medium by the first conveyance unit and discharging of the ink from the discharging part such that when formation of the image is restarted after a temporal stop of the formation of the image by temporarily stopping the conveyance of the recording target medium by the first conveyance unit and the discharging of the ink from the discharging part, a distance from a first position to a recording restart position is an integer multiple of the pitch, the first position being based on a position, at the time of the temporal stop, of the image that is formed on the recording target medium before the temporal stop, the recording restart position being a position where the ink is discharged at the time of the restart, and performing the post-processing on the recording target medium at the post-processing unit each time the recording target medium is conveyed, by the second conveyance unit, a distance corresponding to the pitch.

DESCRIPTION OF EXEMPLARY EMBODIMENTS

Figure 1:
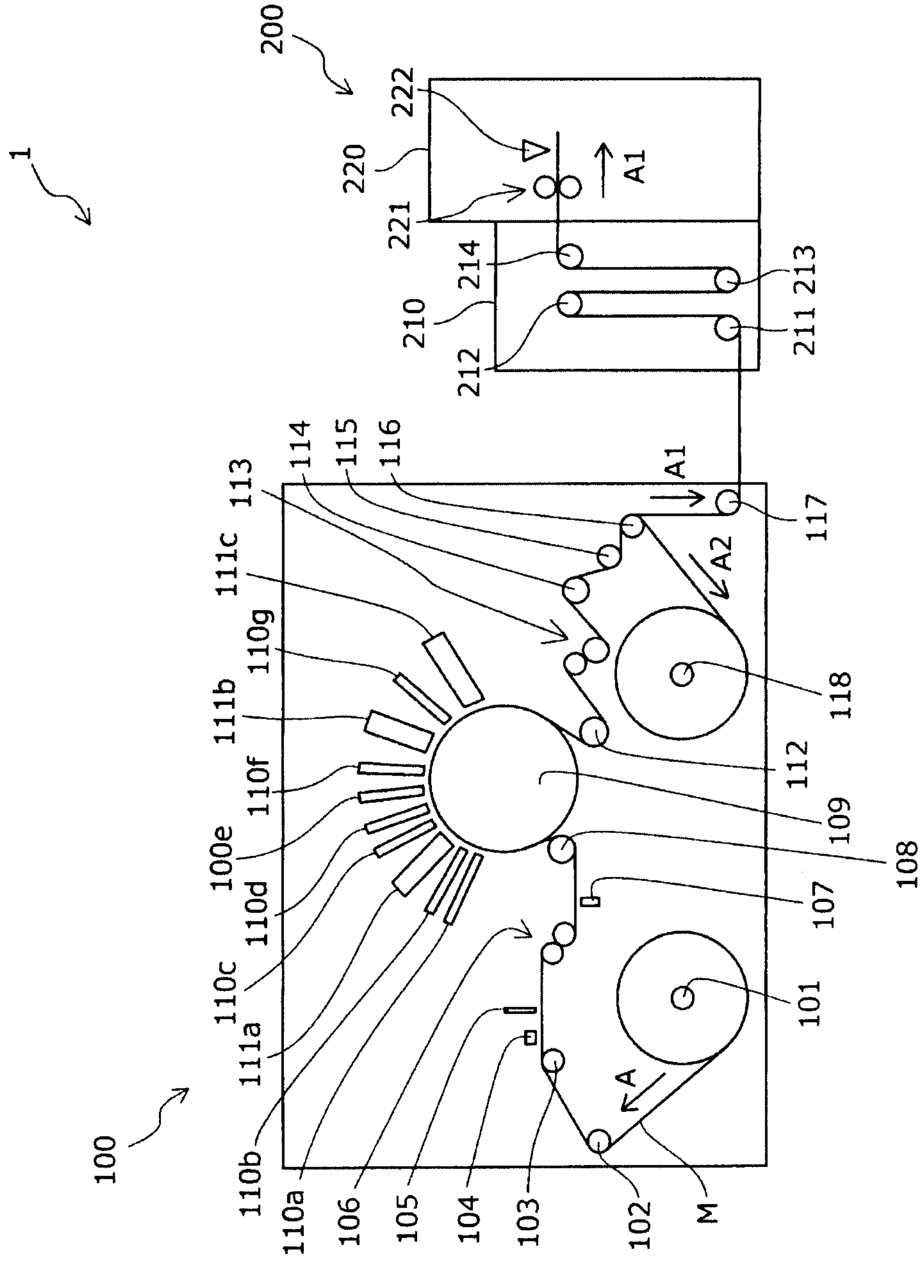
FIG. 1 is a schematic view of a recording system according to an embodiment of the present disclosure.

First, the present disclosure is briefly described below.

A recording system for solving the above-mentioned problems of the present disclosure includes a recording apparatus configured to form an image at a constant interval pitch on a recording target medium, a post-processing apparatus coupled to the recording apparatus and configured to perform post-processing on the recording target medium on which an image is formed by the recording apparatus, and a control unit configured to control the recording apparatus and the post-processing apparatus. The recording apparatus includes a first conveyance unit configured to convey the recording target medium, and a discharging part configured to discharge ink to the recording target medium conveyed by the first conveyance unit, the post-processing apparatus includes a second conveyance unit configured to convey the recording target medium, and a post-processing unit configured to perform post-processing on the recording target medium conveyed by the first conveyance unit, the control unit controls conveyance of the recording target medium by the first conveyance unit and discharging of the ink from the discharging part such that when formation of the image is restarted after a temporal stop of the formation of the image by temporarily stopping the conveyance of the recording target medium by the first conveyance unit and the discharging of the ink from the discharging part, a distance from a first position to a recording restart position is an integer multiple of the pitch, the first position being based on a position, at the time of the temporal stop, of the image that is formed on the recording target medium before the temporal stop, the recording restart position being a position where the ink is discharged at the time of the restart, and the control unit performs control such that the post-processing unit performs the post-processing on the recording target medium each time the recording target medium is conveyed, by the second conveyance unit, a distance corresponding to the pitch.

According to this aspect, at the restart of the image formation after the temporal stop of the image formation through the temporal stop of the conveyance of the recording target medium and the discharging of ink, the conveyance of the recording target medium by the first conveyance unit and the discharging of the ink by the discharging part can be executed such that the distance from the first position based on the image formed on the recording target medium before the temporal stop at the temporal stop position to the recording restart position that is the discharging position of the ink at the restart is an integer multiple of the image pitch, and the post-processing can be performed on the recording target medium each time when the second conveyance unit conveys the recording target medium by the pitch post-processing unit. In this manner, the positional displacement during the post-processing on the recording target medium on which an image is formed by the recording apparatus, i.e., the adjustment of the post-processing start timing with respect to the start timing of the image formation in the main production step can be automatically reduced.

In a recording system according to the second aspect of the present disclosure in the recording system according to the first aspect, the control unit includes a first control unit configured to control the recording apparatus and a second control unit configured to control the post-processing apparatus, the first control unit controls the conveyance of the recording target medium by the first conveyance unit and the discharging of the ink from the discharging part such that the distance from the first position to the recording restart position is an integer multiple of the pitch at the restart after the temporal stop, and the second control unit performs control such that the post-processing unit performs the post-processing on the recording target medium each time when the conveyance of the recording target medium by the second conveyance unit is performed by the pitch.

According to this aspect, the first control unit configured to control the recording apparatus and the second control unit configured to control the post-processing apparatus are provided as the control unit. In this manner, with each of the first control unit and the second control unit, the control of the recording apparatus and the post-processing apparatus can be simplified.

In a recording system according to the third aspect of the present disclosure in the recording system according to the second aspect, the recording apparatus includes a storage unit, the storage unit stores a stable conveyance distance, the stable conveyance distance being a shortest conveyance distance of the recording target medium required at the restart after the temporal stop, the first control unit causes, at the temporal stop, the storage unit to store a distance that is a first distance from the first position to a second position, the second position being a position facing the discharging part at the time of the temporal stop, the first control unit determines a correction distance such that a sum of the first distance, the stable conveyance distance and the correction distance is an integer multiple of the pitch at the restart after the temporal stop, and the first control unit performs control such that the distance from the first position to the recording restart position is the sum of the first distance, the stable conveyance distance and the correction distance.

According to this aspect, at the restart of the image formation after the temporal stop of the image formation through the temporal stop of the conveyance of the recording target medium and the discharging of ink, the correction distance is determined such that the sum of the first distance that is the distance from the first position to the second position that is the position facing the discharging part at the time of the temporal stop, the stable conveyance distance and the correction distance is an integer multiple of the pitch of the image, and the distance from the first position to the recording restart position is set to the sum of the first distance, the stable conveyance distance and the correction distance. While, at the restart of the conveyance of the recording target medium and the discharging of ink after the temporal stop of the conveyance of the recording target medium and the discharging of ink, the stable conveyance distance is required for setting the recording target medium to a desired conveyance speed, the positional displacement during the post-processing on the recording target medium on which an image is formed by the recording apparatus can be automatically reduced in consideration of the stable conveyance distance.

In a recording system according to the fourth aspect of the present disclosure in the recording system according to the third aspect, the recording apparatus includes a first recording mode and a second recording mode as recording modes, the first recording mode being a mode in which the distance from the first position to the recording restart position is set to the sum of the first distance, the stable conveyance distance and the correction distance, the second recording mode being a mode in which the distance from the first position to the recording restart position is set to a sum of the first distance and the stable conveyance distance.

According to this aspect, as recording modes, the second recording mode in which the distance from the first position to the recording restart position is set to the sum of the first distance and the stable conveyance distance is included in addition to the first recording mode in which the distance from the first position to the recording restart position is set to the sum of the first distance, the stable conveyance distance and the correction distance. That is, in addition to the first recording mode in which the position of the post-processing with respect to the position where the image is formed is corrected with the correction distance added thereto, the second recording mode in which the correction distance is not added for the position where the image is formed is provided. In this manner, for example, it is possible to reduce a situation where the recording target medium is wasted by excessively conveying the recording target medium when it is not necessary to add the correction distance such as when the post-processing is not performed.

In a recording system according to the fifth aspect of the present disclosure in the recording system according to the fourth aspect, the post-processing apparatus is configured to be uncoupled from the recording apparatus, and the first control unit employs the second recording mode as the recording mode when the post-processing apparatus is uncoupled from the recording apparatus.

According to this aspect, when the post-processing apparatus is uncoupled from the recording apparatus, the second recording mode is employed as the recording mode. In this manner, it is possible to reduce a situation where the recording target medium is wasted by excessively conveying the recording target medium when the post-processing apparatus is uncoupled from the recording apparatus and the post-processing is not performed.

In a recording system according to the sixth aspect of the present disclosure in the recording system according to the fourth aspect, the post-processing apparatus is configured to be uncoupled from the recording apparatus, and the first control unit employs the first recording mode as the recording mode when the post-processing apparatus is coupled to the recording apparatus.

According to this aspect, when the post-processing apparatus is coupled to the recording apparatus, the first recording mode is employed as the recording mode. In this manner, when the post-processing apparatus is coupled to the recording apparatus and the post-processing is performed, the positional displacement during the post-processing on the recording target medium on which an image is formed by the recording apparatus can be automatically reduced.

In a recording system according to the seventh aspect of the present disclosure in the recording system according to any one of the first to fifth aspects, the recording system includes, between the recording apparatus and the post-processing apparatus, a buffer unit configured to adjust a conveyance distance of the recording target medium, and a measurement unit configured to measure the conveyance distance of the recording target medium located in the buffer unit, the control unit determines, from a measurement result of the measurement unit, whether the conveyance distance of the recording target medium located in the buffer unit allows for reverse conveyance of the recording target medium from the buffer unit to the recording apparatus by a shift amount with respect to a distance of an integer multiple of a length of a unit image region of the image at the time of restart of the formation of the image after the temporal stop, and when the control unit determines that the reverse conveyance is allowed, the control unit controls the first conveyance unit to perform the reverse conveyance by the shift amount.

According to this aspect, with the buffer unit that adjusts the conveyance distance of the recording target medium, it is easy to adjust the positional displacement during the post-processing on the recording target medium on which an image is formed by the recording apparatus. In addition, at the restart of the conveyance of the recording target medium and the discharging of ink after the temporal stop of the conveyance of the recording target medium and the discharging of ink, whether the medium conveyance distance of the recording target in the buffer unit allows for the reverse conveyance of the recording target medium by an integer multiple of the pitch from the buffer unit to the recording apparatus is determined, and the reverse conveyance is performed by the integer multiple of the pitch when it is determined that the reverse conveyance is allowed, and thus, the positional displacement during the post-processing on the recording target medium on which an image is formed by the recording apparatus can be automatically reduced while suppressing the wasteful conveyance of the recording target medium.

A recording apparatus according to the eighth aspect of the present disclosure includes a first conveyance unit configured to convey a recording target medium, a discharging part configured to discharge ink to the recording target medium conveyed by the first conveyance unit, and a control unit. The recording apparatus is configured to form an image at a constant interval pitch on the recording target medium, the recording apparatus is used with a post-processing apparatus including a second conveyance unit configured to convey the recording target medium and a post-processing unit configured to perform post-processing on the recording target medium conveyed by the first conveyance unit, the post-processing apparatus being coupled to the recording apparatus and configured to perform the post-processing on the recording target medium on which an image is formed by the recording apparatus, and the control unit controls conveyance of the recording target medium by the first conveyance unit and discharging of the ink from the discharging part such that when formation of the image is restarted after a temporal stop of the formation of the image by temporarily stopping the conveyance of the recording target medium by the first conveyance unit and the discharging of the ink from the discharging part, a distance from a first position to a recording restart position is an integer multiple of the pitch to allow for the post-processing on the recording target medium at the post-processing unit each time the recording target medium is conveyed, by the second conveyance unit, a distance corresponding to the pitch, the first position being based on a position, at the time of the temporal stop, of the image that is formed on the recording target medium before the temporal stop, the recording restart position being a position where the ink is discharged at the time of the restart.

According to this aspect, at the restart of the image formation after the temporal stop of the image formation through the temporal stop of the conveyance of the recording target medium and the discharging of ink, the conveyance of the recording target medium by the first conveyance unit and the discharging of the ink by the discharging part can be executed such that the distance from the first position based on the image formed on the recording target medium before the temporal stop at the temporal stop position to the recording restart position that is the discharging position of the ink at the restart is an integer multiple of the image pitch. In this manner, the positional displacement during the post-processing on the recording target medium on which an image is formed by the recording apparatus, i.e., the adjustment of the post-processing start timing with respect to the start timing of the image formation in the main production step can be automatically reduced.

A recording method according to the ninth aspect of the present disclosure is a method for a recording system, the recording system including a recording apparatus and a post-processing apparatus, the recording apparatus including a first conveyance unit configured to convey a recording target medium and a discharging part configured to discharge ink to the recording target medium conveyed by the first conveyance unit, the recording apparatus being configured to form an image at a constant interval pitch on the recording target medium, the post-processing apparatus including a second conveyance unit configured to convey the recording target medium and a post-processing unit configured to perform post-processing on the recording target medium conveyed by the first conveyance unit, the post-processing apparatus being coupled to the recording apparatus and configured to perform the post-processing on the recording target medium on which an image is formed by the recording apparatus, the method comprising executing conveyance of the recording target medium by the first conveyance unit and discharging of the ink from the discharging part such that when formation of the image is restarted after a temporal stop of the formation of the image by temporarily stopping the conveyance of the recording target medium by the first conveyance unit and the discharging of the ink from the discharging part, a distance from a first position to a recording restart position is an integer multiple of the pitch, the first position being based on a position, at the time of the temporal stop, of the image that is formed on the recording target medium before the temporal stop, the recording restart position being a position where the ink is discharged at the time of the restart, and performing the post-processing on the recording target medium at the post-processing unit each time the recording target medium is conveyed, by the second conveyance unit, a distance corresponding to the pitch.

According to this aspect, at the restart of the image formation after the temporal stop of the image formation through the temporal stop of the conveyance of the recording target medium and the discharging of ink, the conveyance of the recording target medium by the first conveyance unit and the discharging of the ink by the discharging part are executed such that the distance from the first position based on the image formed on the recording target medium before the temporal stop at the temporal stop position to the recording restart position that is the discharging position of the ink at the restart is an integer multiple of the image pitch, and the post-processing is performed on the recording target medium each time when the second conveyance unit conveys the recording target medium by the pitch post-processing unit. In this manner, the positional displacement during the post-processing on the recording target medium on which an image is formed by the recording apparatus, i.e., the adjustment of the post-processing start timing with respect to the start timing of the image formation in the main production step can be automatically reduced.

An embodiment of the present disclosure is described below. First, an overview of a recording system 1 according to an embodiment of the present disclosure is described below with reference to FIGS. 1 and 2. As illustrated in FIG. 1, the recording system 1 of this embodiment includes a recording apparatus 100, and a post-processing apparatus 200 coupled at a succeeding stage of the recording apparatus 100 in a conveyance direction A of a recording target medium M.

Figure 2:
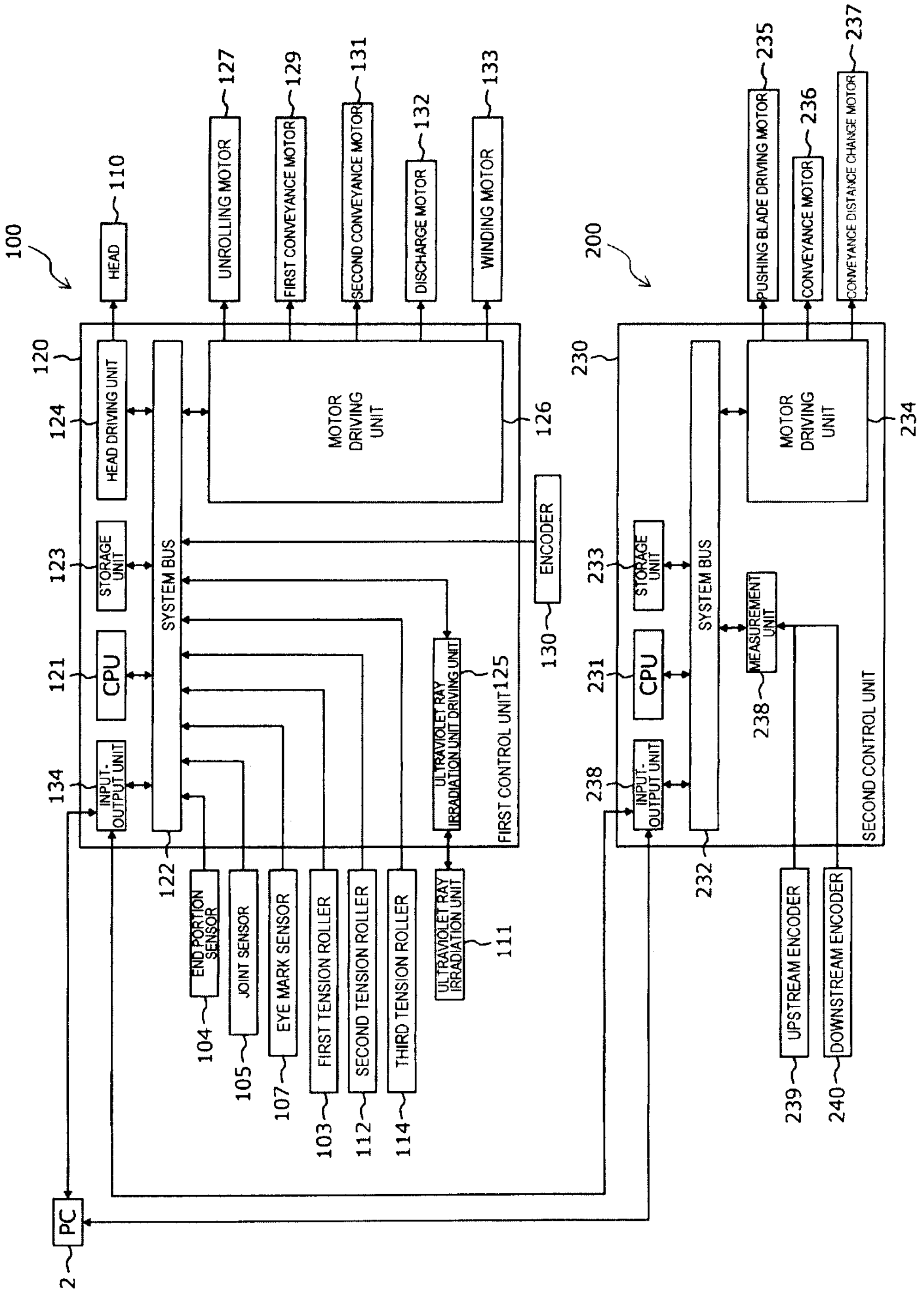
FIG. 2 is a block diagram illustrating an electrical configuration of the recording system according to the embodiment of the present disclosure.

The recording apparatus 100 of this embodiment is a recording apparatus that forms an image on the recording target medium M such as paper, cloth, and film, and is communicatively coupled to a PC2 as illustrated in FIG. 2. Here, the recording system 1 of this embodiment can be regarded as including the PC2. Note that as illustrated in FIG. 1, the recording apparatus 100 of this embodiment can perform recording on the recording target medium M in a rolled form. It should be noted that the configuration that can use the above-mentioned recording target medium is not limitative, and a configuration that can use an alternately folded long recording target medium, for example.

As illustrated in FIG. 1, the recording apparatus 100 of this embodiment includes an unrolling unit 101 that can unroll the recording target medium M by setting and rotating the rolled recording target medium M. The recording target medium M is unrolled by the unrolling unit 101 to a first driving roller 106 through a driven roller 102 and a first tension roller 103. Then, the recording target medium M is conveyed in the conveyance direction A by the first driving roller 106. Here, the term driven means movement along with the movement of the recording target medium M in contact with it.

The tension of the recording target medium M unrolled from the unrolling unit 101 is detected by the first tension roller 103, and the torque of an unrolling motor 127 illustrated in FIG. 2 is controlled by a first control unit 120. An end portion sensor 104 that detects an end portion of the recording target medium M and a joint sensor 105 that detects a joint of the recording target medium M are provided between the first tension roller 103 and the first driving roller 106. When the recording target medium M is conveyed in a meandering manner, the meandering conveyance is corrected by interlocking the unrolling unit 101 and the first tension roller 103 under the control of the first control unit 120 on the basis of the detection result of the end portion sensor 104.

Figure 3:
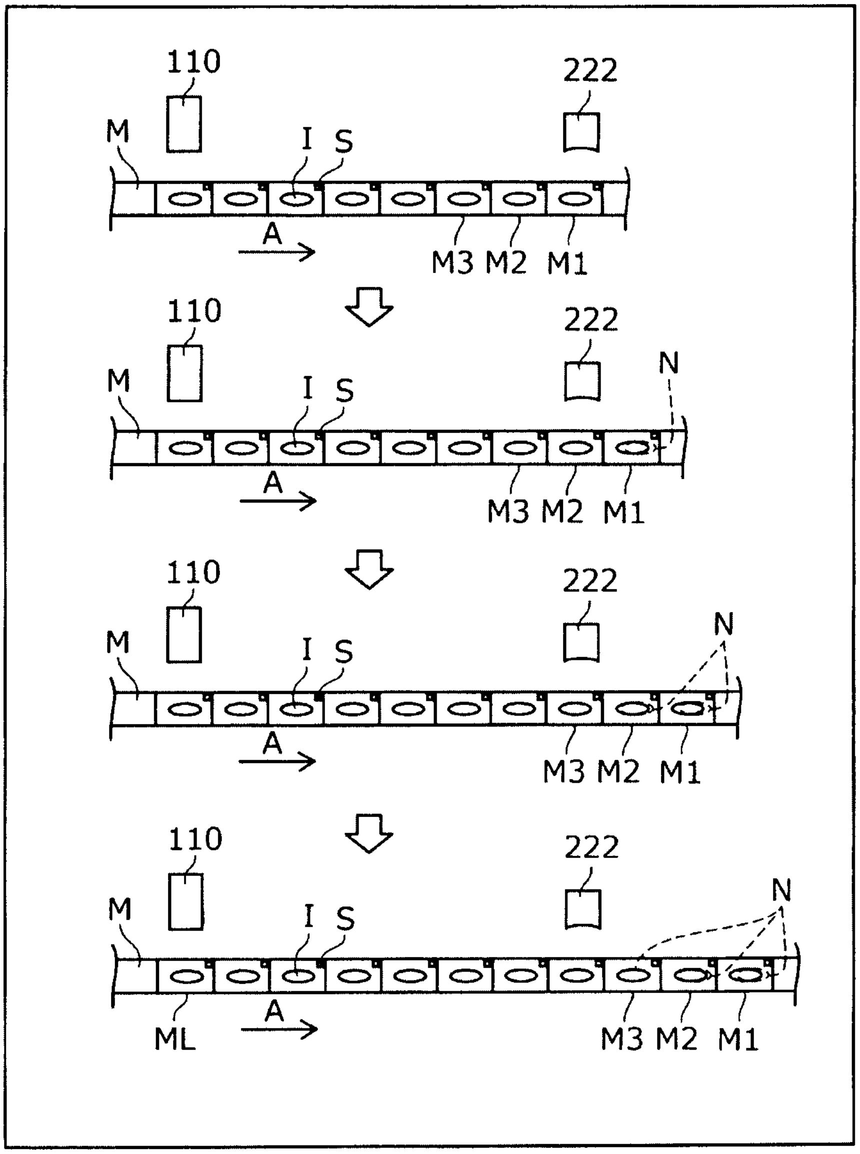
FIG. 3 is a schematic view for describing a position adjustment step.

A driven roller 108 is provided downstream of the first driving roller 106 in the conveyance direction A, and a driven drum 109 serving as a supporting part of the recording target medium M is provided further downstream in the conveyance direction A. An eye mark sensor 107 that detects an eye mark S recorded on the recording target medium M as illustrated in FIG. 3 and the like is provided between the first driving roller 106 and the driven roller 108. Here, the eye mark S is a mark for alignment in the post-processing apparatus 200 for cutting an image I recorded on the recording target medium M, and is a mark used for controlling the timing of the recording in a case where the recording is restarted after a temporal stop, a case where a recording is performed in addition to the previous recording, and the like. Note that the eye mark S may be recorded on the recording target medium M by a head 110 together with the image I, or may be recorded on the recording target medium M in advance.

A plurality of the heads 110 serving as a discharging part that discharges ink, and a plurality of ultraviolet ray irradiation units 111 are provided at positions facing the driven drum 109. The recording apparatus 100 of this embodiment uses ultraviolet curing ink that is cured with irradiation of the ultraviolet ray as the ink, and therefore includes an ultraviolet ray irradiation unit 111. However, the present disclosure may use inks other than the ultraviolet curing ink as the ink, and in that case, the ultraviolet ray irradiation unit 111 may not be provided. In addition, the recording apparatus 100 of this embodiment includes seven heads 110 as the head 110, namely, a head 110*a*, a head 110*b*, a head 110*c*, a head 110*d*, a head 110*e*, a head 110*f*, and a head 110*g*, and includes three ultraviolet ray irradiation units 111 as the ultraviolet ray irradiation unit 111, namely, an ultraviolet ray irradiation unit 111*a*, an ultraviolet ray irradiation unit 111*b*, and an ultraviolet ray irradiation unit 111*c*. However, the number and the arrangement of the heads 110 and the ultraviolet ray irradiation units 111 are not limited.

At positions facing the head 110 and the ultraviolet ray irradiation unit 111, the recording target medium M is conveyed in the state where it is wound around the driven drum 109. The driven drum 109 is provided with an encoder 130 illustrated in FIG. 2, the rotational speed of the driven drum 109 corresponding to the conveyance speed of the recording target medium M is detected by the encoder 130, and the ink discharging timing of the head 110 is controlled by the first control unit 120 such that the image I is formed at a desired position in the recording target medium M. Note that the conveyance distance of the recording target medium M is also managed by the first control unit 120 on the basis of the detection result of the encoder 130.

A second driving roller 113 is provided downstream of the driven drum 109 in the conveyance direction A, through a second tension roller 112. The tension in the conveyance direction A that is exerted on the recording target medium M wound around the driven drum 109 is detected by the second tension roller 112, and is set to a desired tension by controlling the torque of a second conveyance motor 131 illustrated in FIG. 2, which is a driving motor of the second driving roller 113, by the first control unit 120 on the basis of the detection result of the second tension roller 112.

A third tension roller 114, a driven roller 115 and a driven roller 116, in this order, are disposed downstream of the second driving roller 113 in the conveyance direction A. On the downstream side of the driven roller 116 in the conveyance direction A, the conveyance path of the recording target medium M is divided into a conveyance path for the conveyance toward an ejection roller 117 in a conveyance direction A1 to convey the recording target medium M to the post-processing apparatus 200, and a conveyance path for the conveyance toward a winding unit 118 in a conveyance direction A2. Note that both the conveyance direction A1 and the conveyance direction A2 are included in the conveyance direction A.

Through its rotation, the winding unit 118 can wind the recording target medium M in a roll form. The tension exerted on the winding unit 118 can be detected by the third tension roller 114, and can be set to a desired tension by controlling the torque of a winding motor 133 illustrated in FIG. 2, which is a driving motor of the winding unit 118, by the first control unit 120 on the basis of the detection result of the third tension roller 114. Note that the tension may be changed in accordance with the winding diameter of the recording target medium M wound around the winding unit 118. Likewise, the tension exerted on the ejection roller 117 can be detected by the third tension roller 114, and can be set to a desired tension by controlling the torque of a discharge motor 132 illustrated in FIG. 2, which is a driving motor of the ejection roller 117, by the first control unit 120 on the basis of the detection result of the third tension roller 114.

The post-processing apparatus 200 of this embodiment includes a buffer unit 210 for inserting the recording target medium M ejected from the ejection roller 117 of the recording apparatus 100, and adjusting the conveyance distance of the recording target medium M in the inside. In addition, a processing unit 220 that includes a pushing blade 222, and can provide a cut as a post-processing at a desired position in the recording target medium M on which an image is formed, by using the pushing blade 222, is provided.

Inside the buffer unit 210, a driven roller 211, a driven roller 212, a driven roller 213, and a driven roller 214 are provided in this order in the conveyance direction A1. Among them, the positions of the driven roller 211 and the driven roller 214 are fixed, while the driven roller 212 and the driven roller 213 are configured to be vertically movable. The buffer unit 210 can change the conveyance distance of the recording target medium M inside the buffer unit 210.

With the above-described buffer unit 210, the post-processing apparatus 200 of this embodiment can continue the processes without stopping at least one of the recording and the post-processing even in the case where there is a difference between the appropriate conveyance speed of the recording target medium M in the recording apparatus 100 and the appropriate conveyance speed of the recording target medium M in the processing unit 220 described later. Here, the driven roller 211 is provided with an upstream encoder 239 illustrated in FIG. 2, the driven roller 214 is provided with a downstream encoder 240 illustrated in FIG. 2, and a measurement unit 238 coupled to the upstream encoder 239 and the downstream encoder 240 is provided. The measurement unit 238 can measure the conveyance distance of the recording target medium M inside the buffer unit 210 on the basis of the detection result of the upstream encoder 239 and the downstream encoder 240.

Inside the processing unit 220, a driving roller 221 is provided in addition to the pushing blade 222. A second control unit 230 illustrated in FIG. 2 provided in the post-processing apparatus 200 can convey the recording target medium M on which the image I is formed and can provide a cut at a desired position by controlling a conveyance motor 236 to drive the driving roller 221, and by controlling a pushing blade driving motor 235 to move the pushing blade 222.

Next, an electrical configuration in the recording system 1 of this embodiment is described with reference to FIG. 2. In the recording system 1 of this embodiment, the recording apparatus 100 and the post-processing apparatus 200 are electrically coupled to each other, and further, the PC2 is coupled to each of the recording apparatus 100 and the post-processing apparatus 200. It should be noted that this configuration is not limitative. In addition, while each of the recording apparatus 100 and the post-processing apparatus 200 includes the control unit in the recording system 1 of this embodiment, this configuration is not limitative. For example, the control unit of the recording apparatus 100 or the post-processing apparatus 200 may serve also as a control unit of both the recording apparatus 100 and the post-processing apparatus 200, and the PC2 coupled with each of the recording apparatus 100 and the post-processing apparatus 200 may serve also as a control unit of the recording apparatus 100 and the post-processing apparatus 200.

The first control unit 120 as the control unit of the recording apparatus 100 is provided with a CPU 121 that manages the entire control of the recording apparatus 100. Through a system bus 122, the CPU 121 is coupled to a storage unit 123 including a ROM storing various control programs to be executed by the CPU 121 and the like, a RAM and an EEPROM that can temporarily store data, and the like.

In addition, through the system bus 122, the CPU 121 is coupled to a head driving unit 124 for driving each head 110 to cause it to discharge inks. In addition, through the system bus 122, the CPU 121 is coupled to an ultraviolet ray irradiation unit driving unit 125 for driving each ultraviolet ray irradiation unit 111 to cause it to emit an ultraviolet ray.

In addition, through the system bus 122, the CPU 121 is coupled to a motor driving unit 126 coupled to the unrolling motor 127, first conveyance motor 129, the second conveyance motor 131, the discharge motor 132 and the winding motor 133. Here, the unrolling motor 127 is a driving motor of the unrolling unit 101. In addition, first conveyance motor 129 is a driving motor of the first driving roller 106. In addition, the second conveyance motor 131 is a driving motor of the second driving roller 113. In addition, the discharge motor 132 is a driving motor of the ejection roller 117. Further, the winding motor 133 is a driving motor of the winding unit 118.

In addition, through the system bus 122, the CPU 121 is coupled to the end portion sensor 104, the joint sensor 105, and the eye mark sensor 107. In addition, through the system bus 122, the CPU 121 is coupled to the first tension roller 103, the second tension roller 112, and the third tension roller 114. In addition, through the system bus 122, the CPU 121 is coupled to the encoder 130. Further, through the system bus 122 and an input-output unit 134, the CPU 121 is coupled to the PC2 for transmitting and receiving data such as image data and signals.

A CPU 231 that manages the entire control of the post-processing apparatus 200 is provided in the second control unit 230, which is a control unit of the post-processing apparatus 200. Through a system bus 232, the CPU 231 is coupled to a storage unit 233 including a ROM storing various control programs to be executed by the CPU 231 and the like, a RAM and an EEPROM that can temporarily store data, and the like.

In addition, through the system bus 232, the CPU 231 is coupled to the measurement unit 238. The measurement unit 238 is coupled to the upstream encoder 239, which is an encoder provided in the driven roller 211, and the downstream encoder 240, which is an encoder provided in the driven roller 214.

In addition, through the system bus 232, the CPU 231 is coupled to the pushing blade driving motor 235, the conveyance motor 236, a conveyance distance change motor 237, and a motor driving unit 234. Here, the pushing blade driving motor 235 is a driving motor for vertically moving the pushing blade 222. In addition, the conveyance motor 236 is a driving motor of the driving roller 221. In addition, the conveyance distance change motor 237 is a driving motor for vertically moving the driven roller 212 and the driven roller 213. Further, through the system bus 232 and the input-output unit 134, the CPU 231 is coupled to the PC2.

Figure 5:
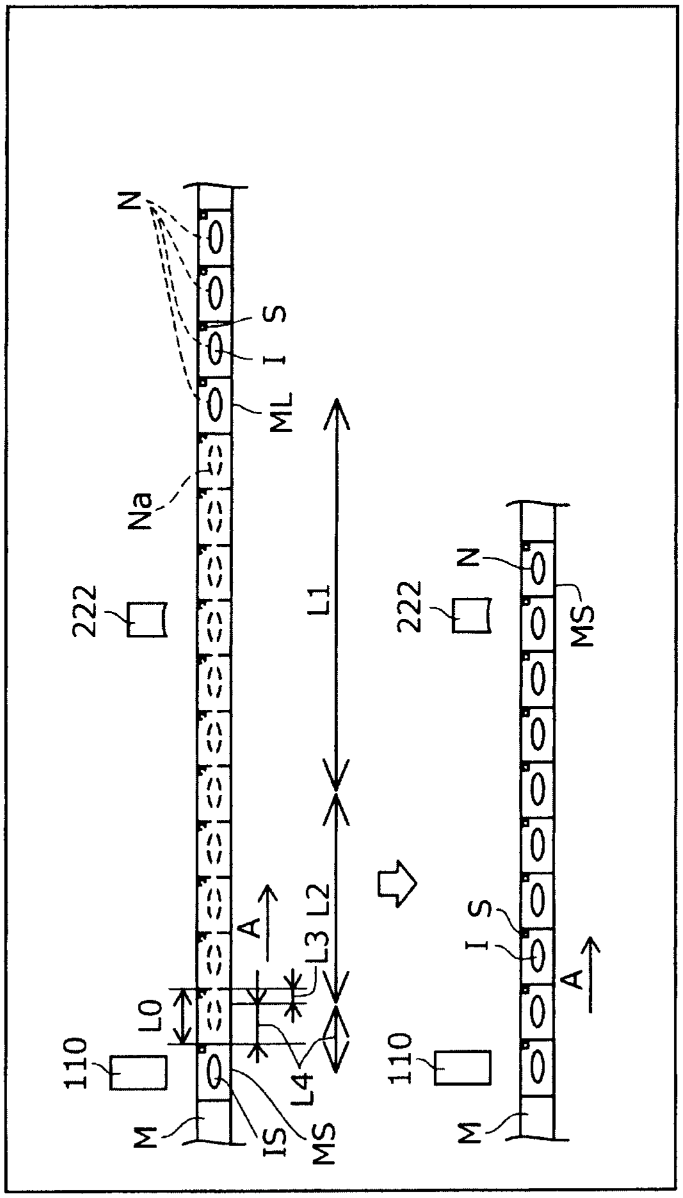
FIG. 5 is a schematic view for describing the main production step using the recording system of the present disclosure.
Figure 6:
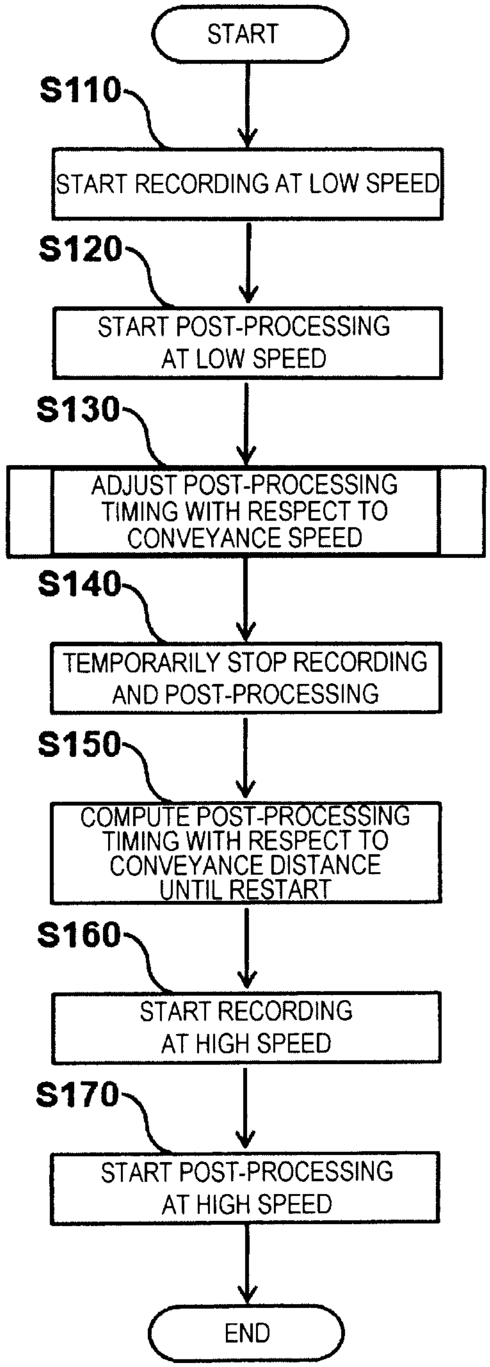
FIG. 6 is a flowchart of an example of a recording method using the recording system of the present disclosure.

Next, an embodiment of a recording method for the above-mentioned recording system 1 is described by using FIG. 6 with reference to FIGS. 3 and 5, mainly from a viewpoint of a position adjustment step, regarding how to adjust the post-processing position at the post-processing apparatus 200 with respect to the position of the image I recorded by the recording apparatus 100. Note that to facilitate understanding of the recording method for the recording system 1 of this embodiment, the following also describes how to adjust the position of the post-processing with respect to the position of the image I in a known recording system by using FIG. 8 with reference to FIG. 7.

When the recording method of this embodiment is started, first, recording at a low speed is started at step S110 as illustrated in FIG. 6. Note that the recording at a low speed is, for example, recording in which the recording target medium M is conveyed at a conveyance speed of 7.6 m/minute. The uppermost state diagram in FIG. 3 illustrates a state where recording at a low speed is started by discharging ink from the head 110 and thereafter a unit image region M1 corresponding to the first image I is conveyed to a region generally opposite the pushing blade 222.

When the state illustrated in the uppermost state diagram in FIG. 3 is set, post-processing at a low speed is started at step S120. The second state diagram from the top in FIG. 3 illustrates a state where a cut is provided in the image I in the unit image region M1 by the pushing blade 222. Note that the second state diagram from the top in FIG. 3 illustrates a state where a cut position N is shifted with respect to the image I in the unit image region M1. Here, since the recording system 1 of this embodiment continuously forms the image I at a certain equal pitch on the recording target medium M, the unit image region corresponds to the formation pitch of the image I.

In view of this, at step S130, an adjustment step for the timing of the post-processing with respect to the conveyance speed of the recording target medium M is performed. More specifically, the user transmits instructional commands such as a command for advancing the cutting timing of the pushing blade 222 to the second control unit 230 through the PC2 and the like, for example. Then, as in the third state diagram from the top in FIG. 3, a state where a cut is provided by the pushing blade 222 to a unit image region M2 corresponding to the second image I from the first image is set. Here, the third state diagram from the top in FIG. 3 illustrates a state where the cut position N is still slightly shifted with respect to the image I of the unit image region M2. In view of this, the user further transmits instructional commands such as a command for advancing the cutting timing of the pushing blade 222 to the second control unit 230 through the PC2 and the like, for example. Then, as in a unit image region M3 corresponding to the third image I from the first image in the state diagram at the bottom in FIG. 3, the cut timing of the pushing blade 222 is matched, and the cut position N is matched with the image I. Here, the data of the cut timing of the pushing blade 222 in the state where the cut timing of the pushing blade 222 is matched is stored in the storage unit 123, the storage unit 233 or the like in association with the conveyance speed of the recording target medium M.

Here, steps S110 to S130 are steps of adjusting the cut timing of the pushing blade 222 with respect to the conveyance speed of the recording target medium M. Specifically, the steps are steps in which the cut timing of pushing blade 222 after the image I is formed by the head 110 is determined in accordance with the conveyance speed of the recording target medium M. In other words, the steps are steps in which the interval between the cut timing for the image I in the unit image region M1 and the cut timing for the image I of the unit image region M2 can be automatically adjusted in accordance with the conveyance speed of the recording target medium M. Therefore, even when the conveyance speed is changed from the conveyance speed of steps S110 to S130, the cut timing of the pushing blade 222 can be automatically adjusted through multiplication of the coefficient according to the amount of change of the conveyance speed. Note that the reason for the conveyance of the recording target medium M at a low speed at steps S110 to S130 is to make it easier for the user to adjust the post-processing position with respect to the position of the image I.

Next, at step S140, the recording and the post-processing are temporarily stopped to prepare for the main production for successively producing the image I with the cut provided at the desired position. While the recording and the post-processing may be temporarily stopped at the same time, it is also possible that after the recording is temporarily stopped first and the post-processing is performed for the image I of the last unit image region ML before the temporal stop of the recording, the post-processing and the conveyance of the recording target medium M are stopped. A reason for this is that the image I provided with the cut at the desired position produced through the execution of steps S110 to S140 can be effectively used. In addition, in the case where ultraviolet curing ink is used as in this embodiment, it is necessary to continue the conveyance of the recording target medium M until at least the ink discharged to the recording target medium reaches the ultraviolet ray irradiation position of the ultraviolet ray irradiation unit 111, and then to temporarily stop the conveyance of the recording target medium M.

Figure 4:
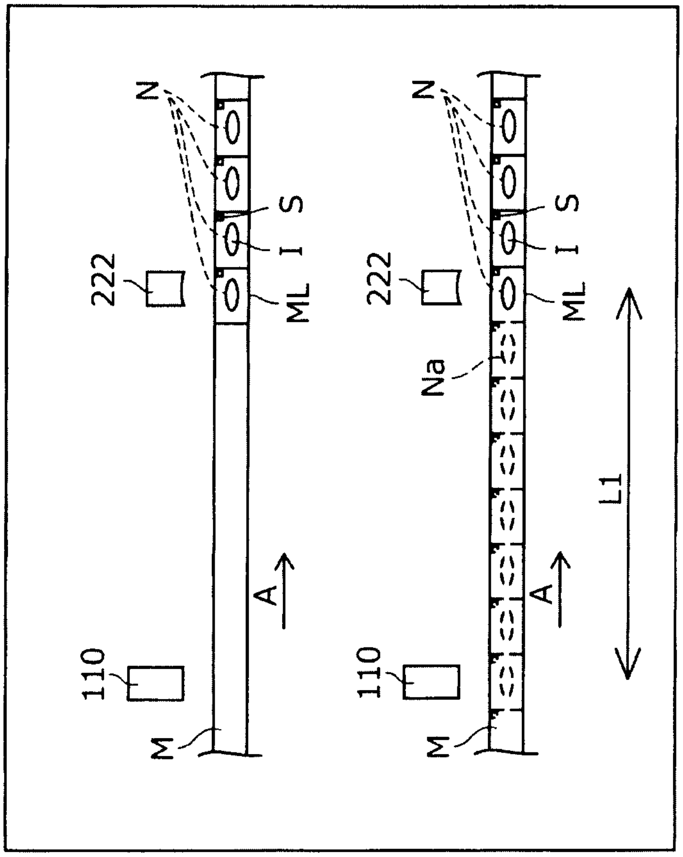
FIG. 4 is a schematic view illustrating a state where the conveyance of a recording target medium is temporarily stopped after completion of the position adjustment step and before a main production step.

The upper state diagram in FIG. 4 illustrates a state where after the recording is temporarily stopped first and the post-processing is performed for the image I of the last unit image region ML before the temporal stop of the recording, the post-processing and the conveyance of the recording target medium M are stopped. Note that the lower state diagram in FIG. 4 illustrates the same state as the upper state diagram in FIG. 4, while the lower state diagram in FIG. 4 illustrates a virtual cut position Na of the case where the cut is provided as it is from the head 110 to the pushing blade 222. In addition, the lower state diagram in FIG. 4 also illustrates an image/head distance L1 between the recording position that is the position facing the head 110 and the image I of the last unit image region ML before the temporal stop of the recording in the state where the conveyance of the recording target medium M is stopped.

Here, to reduce the wastage of the recording target medium M, it is conceivable to convey the recording target medium M in reverse to a position where the unit image region immediately after the unit image region ML faces the head 110. However, it is difficult to convey in reverse the recording target medium M of the position where the cut is provided, because the recording target medium M may be damaged by the cut.

Next, at step S150, the post-processing timing with respect to the conveyance distance of the recording target medium M required for the restart of the conveyance of the recording target medium M and the discharging of ink for the main production after the temporal stop of the conveyance of the recording target medium M and the discharging of ink is computed. While the computation is performed at the first control unit 120 in this embodiment, the computation may be performed at the second control unit 230, the PC2 or the like. Note that this step S150 may be performed while steps S110 to S140 are executed.

Here, the conveyance distance of the recording target medium M required for the restart of the conveyance of the recording target medium M and the discharging of ink for the main production after the temporal stop of the conveyance of the recording target medium M and the discharging of ink is the sum of the image/head distance L1, a stable conveyance distance L2 required for setting the stopped recording target medium M to the conveyance speed of the recording target medium M of the main production, and a correction distance L4 for correction to prevent a shift between the position of the image I and the cut position N upon the start of the main production, as illustrated in the upper state diagram in FIG. 5. Here, the stable conveyance distance L2 is not necessarily equal to the distance of the integer multiple of the length of the unit image region, which is the formation pitch of the image I. In addition, the stable conveyance distance is required not only for the transition from the step of adjusting the cut timing to the main production step, but also for the restart of the image formation after the temporal stop of the image formation.

Figure 7:
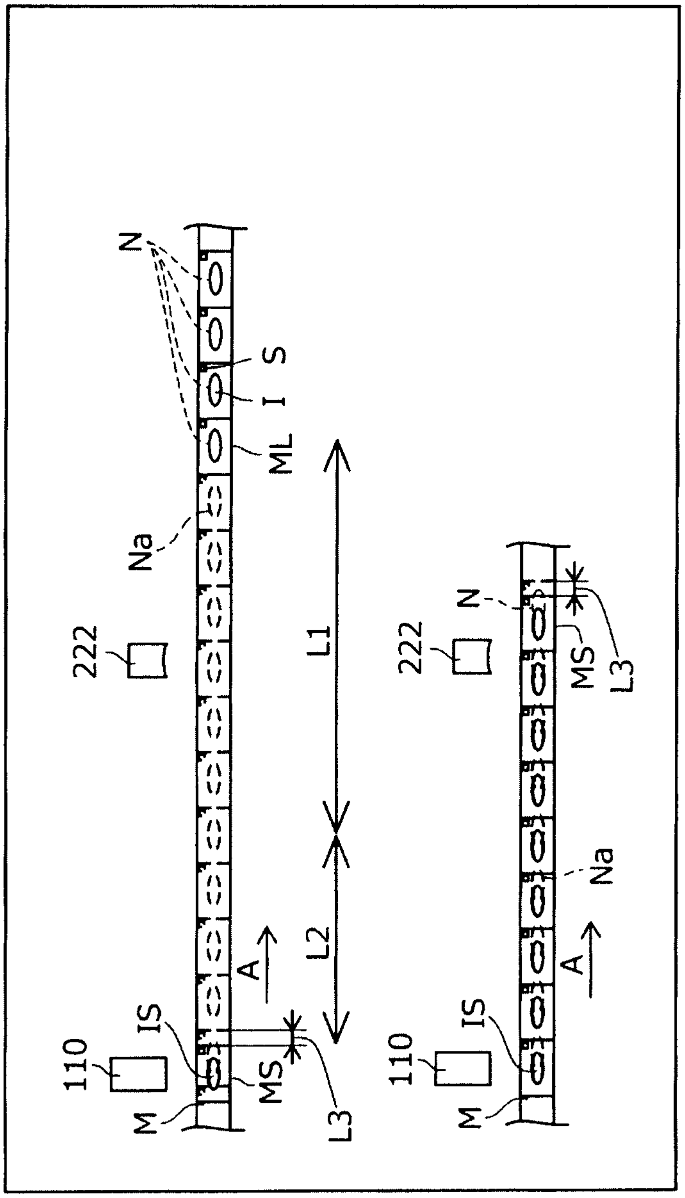
FIG. 7 is a schematic view for describing a main production step using a known recording system.

The upper state diagram in FIG. 5 illustrates a state where the stable conveyance distance L2 is shifted by a shift amount L3 with respect to a distance of an integer multiple of the length of the unit image region. In view of this, if the adjustment of the post-processing start timing with respect to the image formation start timing in the main production is not performed, the post-processing is continuously performed while keeping the state shifted from the desired post-processing timing by the shift amount L3. Note that FIG. 7 is a diagram corresponding to FIG. 5 and using a known recording system, and the lower state diagram in FIG. 7 illustrates a state where the post-processing is continuously performed while keeping the state shifted from the desired post-processing timing by the shift amount L3. Note that the image/head distance L1, the stable conveyance distance L2, the shift amount L3 and the correction distance L4 can be computed at the first control unit 120, the second control unit 230 or the like from the detection results of the encoder 130, the upstream encoder 239 and the downstream encoder and the like.

In view of this, in this embodiment, the correction distance L4 is determined at the first control unit 120, and the adjustment of the post-processing start timing with respect to the image formation start timing in the main production is performed. Here, the correction distance L4 is a value obtained by subtracting the shift amount L3 from the length L0 of the unit image region in the conveyance direction A.

Next, at step S160, recording at a high speed is started in accordance with the main production. Note that the recording at a high speed is, for example, recording of the case where the recording target medium M is conveyed at a conveyance speed of 30 m/minute. The upper state diagram in FIG. 5 illustrates a state where the image I of the first unit image region MS is formed on the recording target medium M immediately after the start of the recording at a high speed in accordance with the main production, and after the restart of the conveyance of the recording target medium M and the discharging of ink for the main production after the temporal stop of the conveyance of the recording target medium M and the discharging of ink.

Then, at step S170, post-processing at a high speed is started in accordance with the main production. The lower state diagram in FIG. 5 illustrates a state where a cut N is provided with no shift with respect to the image I of the unit image region MS immediately after the post-processing at a high speed is started in accordance with the main production. Upon completion of step S160, the recording method of this embodiment is terminated.

Figure 8:
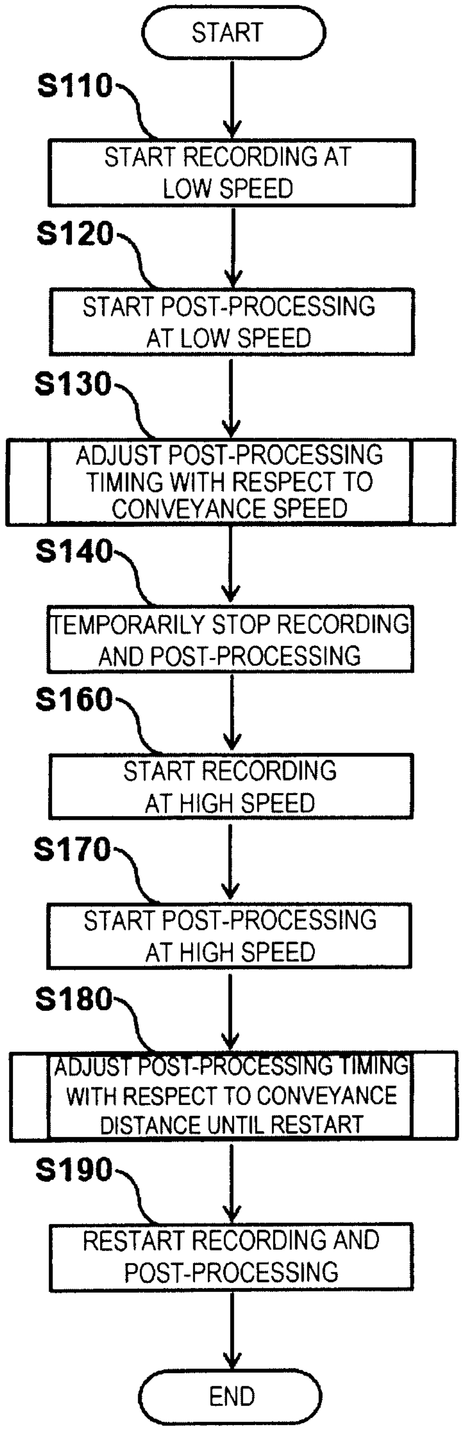
FIG. 8 is a flowchart of an example of a recording method using a known recording system.

Note that in the recording method using the known recording system illustrated in FIG. 8, which does not have a step corresponding to step S150 of the recording method of this embodiment, when step S170 is executed, the cut N shifted with respect to the unit image region is formed as in the lower state diagram in FIG. 7 due to the generation of the shift amount L3 in the upper state diagram in FIG. 7. Consequently, to eliminate this shift, the user manually performs the adjustment of the post-processing start timing with respect to the image formation start timing at step S180, and thereafter restarts the recording and the post-processing at step S190.

To put it briefly, the recording system 1 of this embodiment is a recording system including the recording apparatus 100 configured to form the image I on the recording target medium M at a constant interval pitch, the post-processing apparatus 200 coupled to the recording apparatus 100 and configured to perform post-processing on the recording target medium M on which the image I is formed by the recording apparatus 100, and the first control unit 120 and the second control unit 230 as control units configured to control the recording apparatus 100 and the post-processing apparatus 200. The recording apparatus 100 includes the first driving roller 106 and the second driving roller 113 as first conveyance units configured to convey the recording target medium M, and the head 110 as a discharging part configured to discharge ink to the recording target medium M conveyed by the first driving roller 106 and the second driving roller 113. In addition, the post-processing apparatus 200 includes the driving roller 221 as a second conveyance unit configured to convey the recording target medium M, and the pushing blade 222 as a post-processing unit configured to perform post-processing on the recording target medium M conveyed by the driving roller 221.

Further, at the time of restart of formation of the image I after temporal stop of the formation of the image I through temporal stop of the conveyance of the recording target medium M by the first driving roller 106 and the second driving roller 113 and the discharging of ink by the head 110, the first control unit 120 as a control unit controls the conveyance of the recording target medium M by the first driving roller 106 and the second driving roller 113 and the discharging of ink by the head 110 such that the distance from the first position based on the position of the image I that is formed on the recording target medium M before the temporal stop at the temporal stop to the recording restart position that is the discharging position of the ink at the restart is an integer multiple of the formation pitch of the image I. Here, the first position corresponds to the position of the unit image region ML, the recording restart position corresponds to the position of the unit image region MS, and the distance from the first position to the recording restart position corresponds to the sum of the image/head distance L1, the stable conveyance distance L2 and the correction distance L4. In addition, in conjunction with the control of the above-mentioned first control unit 120, the second control unit 230 as the control unit performs control such that post-processing is performed on the recording target medium M with the pushing blade 222 each time when the recording target medium M is conveyed by the driving roller 221 by the formation pitch of the image I. Note that while the first position corresponds to the position of the unit image region ML in this embodiment, the first position may correspond to a position other than the position of the unit image region ML such as a position of a unit image region located upstream of the unit image region ML by one region in the conveyance direction A, for example. Note that the above-mentioned first position, discharging position, recording restart position and the like are positions on the conveyance path.

To put it briefly from a view point of the recording method, the recording method of this embodiment is a recording method for the above-mentioned recording system 1, in which the conveyance of the recording target medium M by the first driving roller 106 and the second driving roller 113 and the discharging of ink by the head 110 are executed such that the distance from the first position to the recording restart position is an integer multiple of the formation pitch of the image I at the time of restart of formation of the image I after temporal stop of the formation of the image I through the temporal stop of the conveyance of the recording target medium M and the discharging of ink, and the post-processing is performed on the recording target medium M with the pushing blade 222 each time when the recording target medium M is conveyed by the driving roller 221 by the formation pitch of the image I. As described above, by executing the recording method of this embodiment by using the recording system 1 of this embodiment, the positional displacement during the post-processing on the recording target medium M on which the image I is formed by the recording apparatus 100, i.e., the adjustment of the post-processing start timing with respect to the start timing of the image formation in the main production step can be automatically reduced.

To put it briefly from a view point of the recording apparatus 100, the recording apparatus 100 of this embodiment is a recording apparatus that includes the first driving roller 106 and the second driving roller 113 as first conveyance units configured to convey the recording target medium M, the head 110 as a discharging part configured to discharge ink to the recording target medium M conveyed by the first driving roller 106 and the second driving roller 113, and the first control unit 120 as a control unit, and forms the image I at a constant interval pitch on the recording target medium M. Further, it is a recording apparatus that is used together with the post-processing apparatus 200 including the driving roller 221 as a second conveyance unit configured to convey the recording target medium M and the pushing blade 222 configured to perform the post-processing on the recording target medium M conveyed by the driving roller 221. The post-processing apparatus 200 is coupled to the recording apparatus 100 and configured to perform the post-processing on the recording target medium M on which the image I is formed by the recording apparatus 100. Here, the first control unit 120 controls the conveyance of the recording target medium M by the first driving roller 106 and the second driving roller 113 and the discharging of ink by the head 110 such that the post-processing is performed on the recording target medium M with the pushing blade 222 each time when the recording target medium M is conveyed by the driving roller 221 by the formation pitch of the image I. More specifically, at the time of restart of formation of the image I after temporal stop of the formation of the image I through the temporal stop of the conveyance of the recording target medium M and the discharging of ink, the first control unit 120 performs control such that the distance from the first position based on the position of the image I that is formed on the recording target medium M before the temporal stop at the temporal stop to the recording restart position that is the discharging position of the ink at the restart is an integer multiple of the formation pitch of the image I.

Note that as described above, the recording system 1 of this embodiment includes, as control units, the first control unit 120 configured to control the recording apparatus 100 and the second control unit 230 configured to control the post-processing apparatus 200. The first control unit 120 controls the conveyance of the recording target medium M by the first driving roller 106 and the second driving roller 113 and the discharging of ink by the head 110 such that the distance from the first position to the recording restart position is an integer multiple of the formation pitch of the image I at the time of restart of formation of the image I after temporal stop of the formation of the image I through the temporal stop of the conveyance of the recording target medium M and the discharging of ink. In addition, the second control unit 230 performs control such that post-processing is performed on the recording target medium M with the pushing blade 222 each time when the recording target medium M is conveyed by the driving roller 221 by the formation pitch of the image I.

With the above-described configuration, the controls of the recording apparatus 100 and the post-processing apparatus 200 can be simplified with each of the first control unit 120 and the second control unit 230. It should be noted that as described above, the present disclosure is not limited to the above-described configuration. For example, the control unit of the recording apparatus 100 or the post-processing apparatus 200 may serve also as a control unit of both the recording apparatus 100 and the post-processing apparatus 200, and the PC2 coupled with each of the recording apparatus 100 and the post-processing apparatus 200 may serve also as a control unit of the recording apparatus 100 and the post-processing apparatus 200.

Here, in the recording system 1 of this embodiment, the recording apparatus 100 includes the storage unit 123, and the storage unit 123 stores the stable conveyance distance L2, which is the shortest conveyance distance of the recording target medium M required at the time of restart of formation of the image I after temporal stop of the formation of the image I through the temporal stop of the conveyance of the recording target medium M and the discharging of ink. Further, when performing the temporal stop of the conveyance of the recording target medium M and the discharging of ink, the first control unit 120 causes the storage unit 123 to store the image/head distance L1 as the first distance as the distance from the first position to the second position, which is a position facing the head 110 at the time of the temporal stop. Further, at the restart after the temporal stop, the first control unit 120 determines the correction distance L4 such that the sum of the image/head distance L1, the stable conveyance distance L2 and the correction distance L4 is an integer multiple of the formation pitch of the image I, and the first control unit 120 performs control such that the distance from the first position to the recording restart position is the sum of the image/head distance L1, the stable conveyance distance L2 and the correction distance L4.

At the time of restart of formation of the image I after temporal stop of the formation of the image I through the temporal stop of the conveyance of the recording target medium M and the discharging of ink, the stable conveyance distance L2 is required for setting the recording target medium M to a desired conveyance speed. In the recording system 1 of this embodiment, the first control unit 120 performs the control in consideration of the stable conveyance distance L2 as described above, and thus the positional displacement during the post-processing on the recording target medium M on which the image I is formed by the recording apparatus 100 can be automatically reduced in consideration of the stable conveyance distance L2.

Note that as described above, in the recording system 1 of this embodiment, the recording apparatus 100 includes a conveyance path of the conveyance direction A1 toward the ejection roller 117 and a conveyance path of the conveyance direction A2 toward the winding unit 118, at positions downstream of the driven roller 116 in the conveyance direction A. Among them, when the recording target medium M2 on which the image I is formed is conveyed through the conveyance path of the conveyance direction A, the post-processing is not performed, and therefore it is not necessary to consider the positional displacement during the post-processing on the recording target medium M on which the image I is formed.

In view of this, in the recording system 1 of this embodiment, the recording apparatus 100 includes, as recording modes, the second recording mode in which the distance from the first position to the recording restart position is set to the sum of the image/head distance L1 and the stable conveyance distance L2 in addition to the first recording mode in which the distance from the first position to the recording restart position is set to the sum of the image/head distance L1, the stable conveyance distance L2 and the correction distance L4, as described above. Specifically, the recording system 1 of this embodiment includes the second recording mode in which the correction distance L4 is not included for the position the image I is formed in addition to the first recording mode in which the position of the post-processing with respect to the position where the image I is formed is corrected, with the correction distance L4 added thereto. In this manner, the recording system 1 of this embodiment can reduce a situation where the recording target medium M is wasted by excessively conveying the recording target medium M when it is not necessary to include the correction distance L4 such as when the post-processing is not performed.

Here, in the recording system 1 of this embodiment, the post-processing apparatus 200 is configured to be uncoupled from the recording apparatus 100 can be released. Further, when the post-processing apparatus 200 uncoupled from the recording apparatus 100, the first control unit 120 employs the second recording mode as the recording mode. In this manner, the recording system 1 of this embodiment can reduce a situation where the recording target medium M is wasted by excessively conveying the recording target medium M when the post-processing apparatus 200 is uncoupled from the recording apparatus 100 and the post-processing is not performed.

On the other hand, when the post-processing apparatus 200 is coupled to the recording apparatus 100, the first control unit 120 employs the first recording mode as the recording mode. In this manner, when the post-processing apparatus 200 is coupled to the recording apparatus 100 and the post-processing is performed, the recording system 1 of this embodiment can automatically reduce the positional displacement during the post-processing on the recording target medium M on which the image I is formed by the recording apparatus 100.

In addition, as illustrated in FIG. 1, the recording system 1 of this embodiment includes the buffer unit 210 configured to adjust the conveyance distance of the recording target medium M at a position between the recording apparatus 100 and the post-processing apparatus 200, or more specifically, between the recording apparatus 100 and the processing unit 220 making up the post-processing apparatus 200. Further, the recording system 1 of this embodiment includes, inside the buffer unit 210, the measurement unit 238 that measures the conveyance distance of the recording target medium M as illustrated in FIG. 2. At the time of restart of formation of the image I after temporal stop of the formation of the image I through the temporal stop of the conveyance of the recording target medium M and the discharging of ink, the first control unit 120 as the control unit determines whether the conveyance distance of the recording target medium M in the buffer unit 210 allows for reverse conveyance of the recording target medium M by the shift amount L3 from the buffer unit 210 to the recording apparatus 100, from the measurement result of the measurement unit 238, and, when the first control unit 120 determines that reverse conveyance is allowed, the first control unit 120 controls the first driving roller 106 and the second driving roller 113 to perform reverse conveyance by the shift amount L3.

In the recording system 1 of this embodiment, with the buffer unit 210 that adjusts the conveyance distance of the recording target medium M, it is easy to adjust the positional displacement during the post-processing on the recording target medium M on which the image I is formed by the recording apparatus 100. In addition, at the time of restart of formation of the image I after temporal stop of the formation of the image I through the temporal stop of the conveyance of the recording target medium M and the discharging of ink, the recording system 1 of this embodiment determines whether the conveyance distance of the recording target medium M in the buffer unit 210 allows for reverse conveyance of the recording target medium M from the buffer unit 210 to the recording apparatus 100 by the shift amount L3, and the reverse conveyance is performed by the shift amount L3 when it is determined that reverse conveyance is allowed, and thus, the positional displacement during the post-processing on the recording target medium M on which the image I is formed by the recording apparatus 100 can be automatically reduced while reducing the wasteful conveyance of the recording target medium M. Note that conveyance failures may occur due to slits or the like formed in the recording target medium M in the case where the recording target medium M on which the post-processing is performed is conveyed in reverse; however, the post-processing is not yet performed on the recording target medium M in the buffer unit 210, and thus the configuration of this embodiment can also reduce the risk of the conveyance failures.

The present disclosure is not limited to the embodiments described above, and can be realized in various configurations without departing from the gist of the present disclosure. For example, appropriate replacements or combinations may be made to the technical features in the present embodiments which correspond to the technical features in the aspects described in the SUMMARY section to solve some or all of the problems described above or to achieve some or all of the advantageous effects described above. In addition, when the technical features are not described herein as essential technical features, such technical features may be deleted appropriately.

What is claimed is:

1. A recording system comprising:

a recording apparatus configured to form an image at a constant interval pitch on a recording target medium;

a post-processing apparatus coupled to the recording apparatus and configured to perform post-processing on the recording target medium on which an image is formed by the recording apparatus; and a control unit configured to control the recording apparatus and the post-processing apparatus, wherein the recording apparatus includes a first conveyance unit configured to convey the recording target medium, and a discharging part configured to discharge ink to the recording target medium conveyed by the first conveyance unit, the post-processing apparatus includes a second conveyance unit configured to convey the recording target medium, and a post-processing unit configured to perform post-processing on the recording target medium conveyed by the second conveyance unit, the control unit controls conveyance of the recording target medium by the first conveyance unit and discharging of the ink from the discharging part such that when formation of the image is restarted after a temporal stop of the formation of the image by temporarily stopping the conveyance of the recording target medium by the first conveyance unit and the discharging of the ink from the discharging part, a distance from a first position to a recording restart position is an integer multiple of the pitch, the first position being based on a position, at the time of the temporal stop, of the image that is formed on the recording target medium before the temporal stop, the recording restart position being a position where the ink is discharged at the time of the restart, and the control unit performs control such that the post-processing unit performs the post-processing on the recording target medium each time the recording target medium is conveyed, by the second conveyance unit, a distance corresponding to the pitch.

2. The recording system according to claim 1, wherein the control unit includes a first control unit configured to control the recording apparatus and a second control unit configured to control the post-processing apparatus;

the first control unit controls the conveyance of the recording target medium by the first conveyance unit and the discharging of the ink from the discharging part such that the distance from the first position to the recording restart position is an integer multiple of the pitch at the time of the restart after the temporal stop; and the second control unit performs control such that the post-processing unit performs the post-processing on the recording target medium each time the recording target medium is conveyed, by the second conveyance unit, a distance corresponding to the pitch.

3. The recording system according to claim 2, wherein the recording apparatus includes a storage unit;

the storage unit stores a stable conveyance distance, the stable conveyance distance being a shortest conveyance distance of the recording target medium required at the time of the restart after the temporal stop;

the first control unit causes, at the temporal stop, the storage unit to store a first distance that is a distance from the first position to a second position, the second position being a position facing the discharging part at the time of the temporal stop;

the first control unit determines a correction distance such that a sum of the first distance, the stable conveyance distance and the correction distance is an integer multiple of the pitch at the time of the restart after the temporal stop; and the first control unit performs control such that the distance from the first position to the recording restart position is the sum of the first distance, the stable conveyance distance and the correction distance.

4. The recording system according to claim 3, wherein the recording apparatus includes a first recording mode and a second recording mode as recording modes, the first recording mode being a mode in which the distance from the first position to the recording restart position is set to the sum of the first distance, the stable conveyance distance and the correction distance, the second recording mode being a mode in which the distance from the first position to the recording restart position is set to a sum of the first distance and the stable conveyance distance.

5. The recording system according to claim 4, wherein the post-processing apparatus is configured to be uncoupled from the recording apparatus; and the first control unit employs the second recording mode as the recording mode when the post-processing apparatus is uncoupled from the recording apparatus.

6. The recording system according to claim 4, wherein the post-processing apparatus is configured to be uncoupled from the recording apparatus; and the first control unit employs the first recording mode as the recording mode when the post-processing apparatus is coupled to the recording apparatus.

7. The recording system according to claim 1, wherein the recording system includes, between the recording apparatus and the post-processing apparatus, a buffer unit configured to adjust a conveyance distance of the recording target medium, and a measurement unit configured to measure the conveyance distance of the recording target medium located in the buffer unit;

the control unit determines, from a measurement result of the measurement unit, whether the conveyance distance of the recording target medium located in the buffer unit allows for reverse conveyance of the recording target medium from the buffer unit to the recording apparatus by a shift amount with respect to a distance of an integer multiple of a length of a unit image region of the image at the time of restart of the formation of the image after the temporal stop; and when the control unit determines that the reverse conveyance is allowed, the control unit controls the first conveyance unit to perform the reverse conveyance by the shift amount.

8. A recording apparatus comprising:

a first conveyance unit configured to convey a recording target medium;

a discharging part configured to discharge ink to the recording target medium conveyed by the first conveyance unit; and a control unit, wherein the recording apparatus is configured to form an image at a constant interval pitch on the recording target medium, the recording apparatus is used with a post-processing apparatus including a second conveyance unit configured to convey the recording target medium and a post-processing unit configured to perform post-processing on the recording target medium conveyed by the second conveyance unit, the post-processing apparatus being coupled to the recording apparatus and configured to perform the post-processing on the recording target medium on which an image is formed by the recording apparatus, and the control unit controls conveyance of the recording target medium by the first conveyance unit and discharging of the ink from the discharging part such that when formation of the image is restarted after a temporal stop of the formation of the image by temporarily stopping the conveyance of the recording target medium by the first conveyance unit and the discharging of the ink from the discharging part, a distance from a first position to a recording restart position is an integer multiple of the pitch to allow for the post-processing on the recording target medium at the post-processing unit each time the recording target medium is conveyed, by the second conveyance unit, a distance corresponding to the pitch, the first position being based on a position, at the time of the temporal stop, of the image that is formed on the recording target medium before the temporal stop, the recording restart position being a position where the ink is discharged at the time of the restart.

9. A recording method for a recording system, the recording system including a recording apparatus and a post-processing apparatus, the recording apparatus including a first conveyance unit configured to convey a recording target medium and a discharging part configured to discharge ink to the recording target medium conveyed by the first conveyance unit, the recording apparatus being configured to form an image at a constant interval pitch on the recording target medium, the post-processing apparatus including a second conveyance unit configured to convey the recording target medium and a post-processing unit configured to perform post-processing on the recording target medium conveyed by the second conveyance unit, the post-processing apparatus being coupled to the recording apparatus and configured to perform the post-processing on the recording target medium on which an image is formed by the recording apparatus, the method comprising:

executing conveyance of the recording target medium by the first conveyance unit and discharging of the ink from the discharging part such that when formation of the image is restarted after a temporal stop of the formation of the image by temporarily stopping the conveyance of the recording target medium by the first conveyance unit and the discharging of the ink from the discharging part, a distance from a first position to a recording restart position is an integer multiple of the pitch, the first position being based on a position, at the time of the temporal stop, of the image that is formed on the recording target medium before the temporal stop, the recording restart position being a position where the ink is discharged at the time of the restart; and performing the post-processing on the recording target medium at the post-processing unit each time the recording target medium is conveyed, by the second conveyance unit, a distance corresponding to the pitch.

* * * * *